US011293396B2

(12) United States Patent
Yamamoto

(10) Patent No.: US 11,293,396 B2
(45) Date of Patent: Apr. 5, 2022

(54) ION CURRENT DETECTION CIRCUIT, IGNITION CONTROL APPARATUS, AND IGNITION SYSTEM

(71) Applicant: Mitsubishi Electric Corporation, Tokyo (JP)

(72) Inventor: Koji Yamamoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/277,964

(22) PCT Filed: Dec. 25, 2018

(86) PCT No.: PCT/JP2018/047508
§ 371 (c)(1),
(2) Date: Mar. 19, 2021

(87) PCT Pub. No.: WO2020/136709
PCT Pub. Date: Jul. 2, 2020

(65) Prior Publication Data
US 2021/0381481 A1    Dec. 9, 2021

(51) Int. Cl.
*F02P 17/12*    (2006.01)
*G01L 23/22*    (2006.01)
(Continued)

(52) U.S. Cl.
CPC ............ *F02P 17/12* (2013.01); *G01L 23/225* (2013.01); *G01M 15/044* (2013.01);
(Continued)

(58) Field of Classification Search
CPC ... F02P 17/12; F02P 2017/125; G01L 23/225; G01M 15/11
(Continued)

(56) References Cited

U.S. PATENT DOCUMENTS 5,483,818 A * 1/1996 Brandt .................... F02P 17/12
324/123 C
5,652,520 A * 7/1997 Kawamoto ............. F02P 17/12
324/388
(Continued)

FOREIGN PATENT DOCUMENTS

CN        2088257 U      11/1991
JP      10-002272 A       1/1998
(Continued)

OTHER PUBLICATIONS

An Office Action; "Notice of Reasons for Refusal", mailed by the Japanese Patent Office dated Jun. 29, 2021, which corresponds to Japanese Patent Application No. 2020-561990 and is related to U.S. Appl. No. 17/277,964; with English language translation.
(Continued)

*Primary Examiner* — Erick R Solis
(74) *Attorney, Agent, or Firm* — Studebaker & Brackett PC

(57) ABSTRACT

An ion current detection circuit is for detecting an ion current flowing through a spark plug for an internal combustion engine. A detection terminal is to be electrically connected to the spark plug. A reference potential is to be supplied to a reference terminal. At least one protection diode is provided between the detection terminal and the reference terminal. A current detection unit causes a detection current to flow between the detection terminal and the at least one protection diode. A current compensation unit causes a compensation current to flow between the detection terminal and the at least one protection diode.

14 Claims, 8 Drawing Sheets

(51) Int. Cl.
*G01M 15/11* (2006.01)
*G01M 15/04* (2006.01)

(52) U.S. Cl.
CPC .......... *G01M 15/048* (2013.01); *G01M 15/11* (2013.01); *F02P 2017/125* (2013.01)

(58) Field of Classification Search
USPC ................ 123/406.37; 73/114.08, 114.62
See application file for complete search history.

(56) References Cited

U.S. PATENT DOCUMENTS

| | | |
|---|---|---|
| 5,747,670 A | 5/1998 | Takahashi et al. |
| 5,914,604 A * | 6/1999 | Bahr .................. F02P 15/10 324/399 |
| 6,075,366 A | 6/2000 | Yasuda |
| 2007/0137628 A1 | 6/2007 | Naruse et al. |

FOREIGN PATENT DOCUMENTS

| | | |
|---|---|---|
| JP | 11-159430 A | 6/1999 |
| JP | 2007-162650 A | 6/2007 |

OTHER PUBLICATIONS

International Search Report issued in PCT/JP2018/047508; dated Mar. 26, 2019.

* cited by examiner

ION CURRENT DETECTION CIRCUIT, IGNITION CONTROL APPARATUS, AND IGNITION SYSTEM

TECHNICAL FIELD

The present invention relates to an ion current detection circuit, an ignition control apparatus, and an ignition system.

BACKGROUND ART

An internal combustion engine compresses an air-fuel mixture of air and fuel and uses electric sparks to ignite the air-fuel mixture. The electric sparks are generated by applying a high voltage to a spark plug installed in a combustion chamber. The state in which the air-fuel mixture is not unintentionally combusted due to the failure of ignition is called misfire. In the case of misfire, not only is the output of the internal combustion engine not sufficiently obtained, but also problems such as corrosion of a silencer and the like occur due to an inflow of the air-fuel mixture containing a large amount of fuel into an exhaust system. On the other hand, the phenomenon of spontaneous ignition after fuel injection by a heat source such as carbon in the combustion chamber before the ignition operation by the spark plug is called pre-ignition. In the case of pre-ignition, not only the temperature inside the cylinder rises more than necessary, but also the rotation becomes abnormal because it is not regular ignition. As a result, the internal combustion engine is burdened and the life may be shortened. As these measures, it is conceivable to detect misfire and pre-ignition and feedback the results. By this feedback, pressure and temperature in a cylinder are regulated and fuel injection and ignition timing are optimized.

As a method of detecting misfire and pre-ignition, there is a method of detecting an ion current. When combustion is performed in the combustion chamber, the molecules in the combustion chamber are ionized accordingly. When a high voltage is applied to the combustion chamber in the ionized state through the spark plug, a small amount of current flows. This current is called an ion current. At the time of misfire, the ion current becomes extremely small, and at the time of pre-ignition, the ion current flows before the normal ignition timing. Therefore, by detecting the ion current, misfire and pre-ignition can be detected.

For example, according to Japanese Patent Application Laid-Open No. 11-159430 (1999) (Patent Document 1), an ion current detection circuit for an internal combustion engine is disclosed. This circuit converts the detected ion current into a voltage and outputs it. This ion current detection circuit is provided with a diode having a forward direction from an input unit to a ground potential and a diode having a forward direction from the ground potential to the input unit.

PRIOR ART DOCUMENTS

Patent Document

Patent Document 1: Japanese Patent Application Laid-Open No. 11-159430 (1999)

SUMMARY

Problem to be Solved by the Invention

The diodes are provided for the purpose of securing an ignition current path and protecting a surge. On the other hand, when the ion current is detected, the current flowing through these diodes leads to a detection error. Therefore, it is desired that the leakage current (weak current flowing through the diodes when the ion current is detected) is small. However, these diodes are intended for the purpose of securing an ignition current path and protecting a surge, and a large size is required to secure the function for that purpose. When the size is large as described above, there is a limit to reducing the leakage current. Therefore, due to the influence of the leakage current, the detected value of the ion current includes a non-negligible error. In any type of diode, the leakage current usually increases as the temperature becomes higher. Therefore, the detection error of the ion current due to the leakage current depends on the temperature, and increases as the temperature becomes higher. Therefore, detection with high accuracy is difficult, especially at high temperature.

The present invention has been made to solve the above problem, and one object thereof is to provide an ion current detection circuit capable of improving the detection accuracy of an ion current.

Means to Solve the Problem

An ion current detection circuit of the present invention is for detecting an ion current flowing through a spark plug for an internal combustion engine. The ion current detection circuit includes a detection terminal, a reference terminal, at least one protection diode, a current detection unit, and a current compensation unit. The detection terminal is to be electrically connected to the spark plug. A reference potential is to be supplied to the reference terminal. The at least one protection diode is provided between the detection terminal and the reference terminal. The current detection unit causes a detection current to flow between the detection terminal and the at least one protection diode. The current compensation unit causes a compensation current to flow between the detection terminal and the at least one protection diode.

Effects of the Invention

According to the present invention, the current compensation unit causes the compensation current to flow between the detection terminal and the at least one protection diode. As a result, the leakage current flowing through the at least one protection diode is compensated for. Therefore, the detection error of the ion current due to the leakage current is suppressed. Therefore, the detection accuracy of the ion current can be improved.

The object, features, aspects, and advantages of the present invention will become more apparent with the following detailed description and the accompanying drawings.

DESCRIPTION OF EMBODIMENTS

Figure 1:
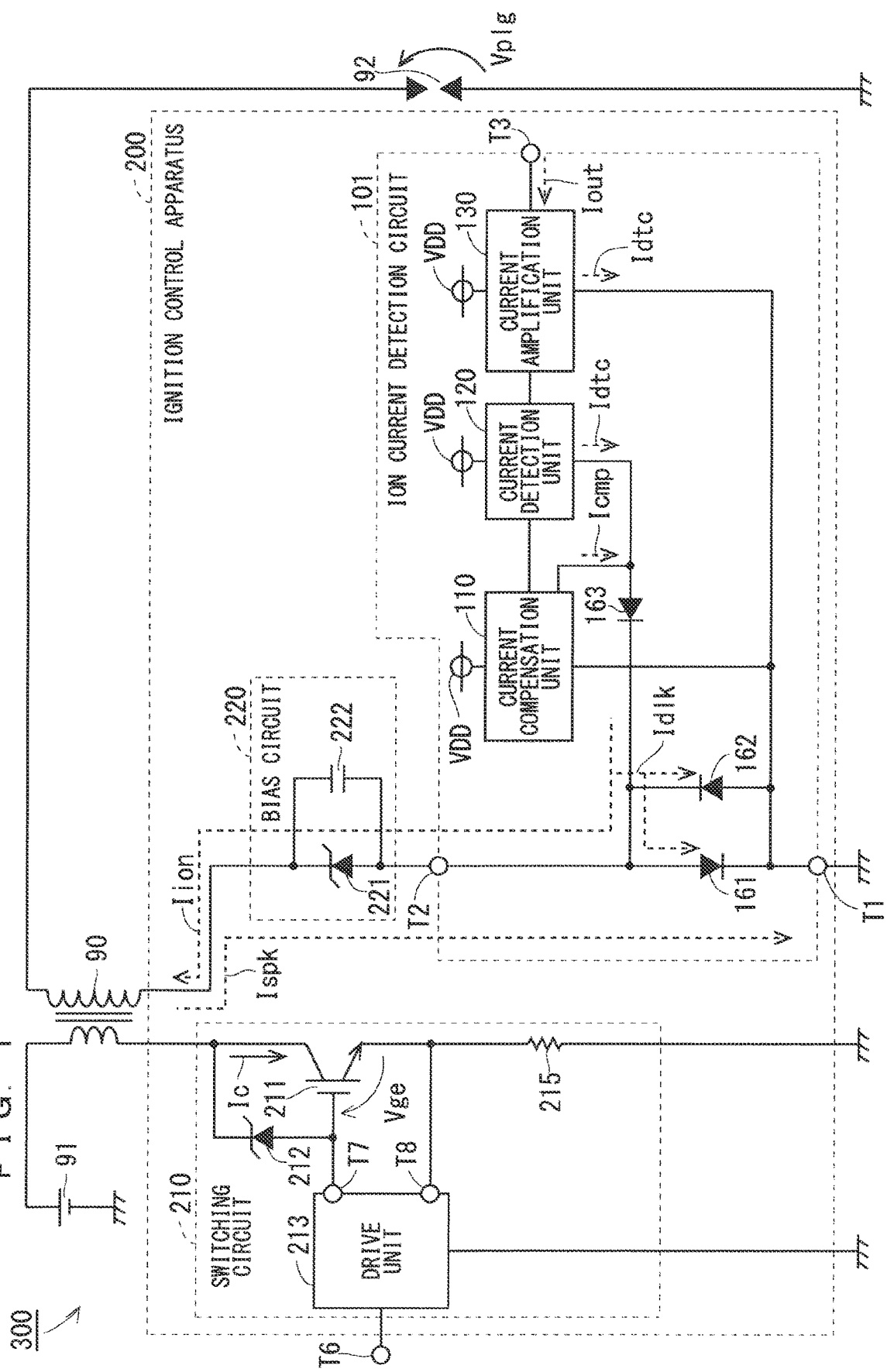
FIG. 1 is a circuit diagram schematically showing a configuration of an ignition system in a first embodiment of the present invention.

Hereinafter, embodiments of the present invention will be described with reference to the drawings. In the drawings below, the same or corresponding parts are denoted by the same reference numbers, and the description is not repeated.

First Embodiment (Ignition System Configuration)

FIG. 1 is a circuit diagram schematically showing a configuration of an ignition system 300 in a first embodiment. The ignition system 300 is for an internal combustion engine. The ignition system 300 includes a spark plug 92 for an internal combustion engine, an ignition coil 90, a battery 91 (power supply), and an ignition control apparatus 200. The ignition control apparatus 200 is for controlling ignition of the spark plug 92.

The ignition coil 90 is a transformer having a primary coil and a secondary coil having a number of turns larger than a number of turns of the primary coil. One end of the spark plug 92 is connected to the secondary coil of the ignition coil 90. The other end of the spark plug 92 is connected to a reference potential. The reference potential is usually a ground potential. The battery 91 is connected to one end of the primary coil of the ignition coil 90, and applies a voltage to the ignition coil 90 with reference to a reference potential. As will be described in detail later, discharge for ignition is performed by momentarily increasing a voltage Vplg applied to the ignition coil 90. At this moment, an ignition current Ispk is generated. If the ignition by the discharge is successful, combustion is started. During the combustion, an ion current Iion that passes between gaps of the spark plug 92 flows according to the voltage Vplg.

(Configuration of Ignition Control Apparatus)

The ignition control apparatus 200 includes a switching circuit 210, a bias circuit 220, and an ion current detection circuit 101.

The switching circuit 210 is connected to the other end of the primary coil of the ignition coil 90 and a reference potential. The switching circuit 210 has a function of opening and closing a current flowing through the primary coil of the ignition coil 90. The switching circuit 210 includes a drive unit 213, an Insulated Gate Bipolar Transistor (IGBT) 211 (semiconductor switching element), a Zener diode 212, and a monitor resistor 215.

The drive unit 213 is an electric circuit including a control terminal T6, a drive terminal T7, and a monitor terminal T8. The drive unit 213 is for driving the IGBT 211 in response to a control signal to the control terminal T6.

The IGBT 211 includes a collector, an emitter, and a gate. The collector is connected to the primary coil of the ignition coil 90. The emitter is connected to a reference potential via a monitor resistor 215. The gate is connected to the drive terminal T7 of the drive unit 213. The IGBT 211 opens and closes a collector current Ic (load current) according to a drive signal from the drive terminal T7 of the drive unit 213. As a result, the IGBT 211 opens and closes the current which is generated by the battery 91 and flows through the primary coil of the ignition coil 90. Instead of the IGBT, another semiconductor switching element such as a Metal Oxide Semiconductor Field Effect Transistor (MOSFET) may be used.

The Zener diode 212 is connected between the drive terminal T7 of the drive unit 213 and the primary coil of the ignition coil 90 so as to have a forward direction from the drive terminal T7 of the drive unit 213 to the primary coil of the ignition coil 90. The monitor terminal T8 of the drive unit 213 is connected to the reference potential via the monitor resistor 215.

The bias circuit 220 is for supplying a voltage for generating the ion current Iion. The bias circuit 220 includes a constant voltage diode 221 and a capacitor 222. The constant voltage diode 221 has one end connected to the spark plug 92 via the ignition coil 90 and the other end connected to a reference potential via the ion current detection circuit 101. As a result, the constant voltage diode 221 is inserted in a path of the ion current Iion flowing through the spark plug 92. The constant voltage diode 221 has a forward direction in the direction of the ion current Iion, and specifically, has a forward direction from the ion current detection circuit 101 to the ignition coil 90. The constant voltage diode 221 is, for example, a Zener diode. The capacitor 222 is connected in parallel to the constant voltage diode 221.

(Outline of Configuration of Ion Current Detection Circuit)

The ion current detection circuit 101 is for detecting the ion current Iion flowing through the spark plug 92. The ion current detection circuit 101 includes a current detection unit 120, a current amplification unit 130 (amplification unit), a current compensation unit 110, protection diodes 161 and 162, a reverse blocking diode 163, a reference terminal T1, a detection terminal T2, and an output terminal T3. The reference potential is to be supplied to the reference terminal T1. The reference terminal T1 is a ground terminal to which the ground potential is normally supplied. The detection terminal T2 is electrically connected to the spark plug 92 via the ignition coil 90. From the output terminal T3, a signal corresponding to the ion current Iion (current signal in the present embodiment) is output. The information represented by this signal is used, for example, by an ECU (Engine Control Unit) (not shown) and is reflected in the content of the control signal sent to the control terminal T6 of the drive unit 213. As a result, a more appropriate combustion state can be obtained.

The protection diodes 161 and 162 are provided between the detection terminal T2 and the reference terminal T1. The protection diodes 161 and 162 are connected in antiparallel to each other. The protection diode 161 has a forward direction from the detection terminal 12 to the reference terminal T1. The protection diode 162 has a forward direction from the reference terminal T1 to the detection terminal T2. The protection diode 161 allows the ignition current Ispk to pass between the detection terminal T2 and the reference terminal T1 when the spark plug 92 discharges, and approximately insulates between the detection terminal T2 and the reference terminal T1 when the ion current Iion, which is a weak current, is detected. The protection diode 162 is provided for surge protection. For example, a surge current flowing from the reference terminal T1 into the ion current detection circuit 101 is released to the detection terminal 12 by the protection diode 162. As a result, the protection diode 161, the reverse blocking diode 163, the current detection unit 120, and the like are protected from the surge current. The reverse blocking diode 163 is arranged between the detection terminal T2 and the current detection unit 120, and blocks the current in a direction reverse to a direction of a detection current Idtc.

The current detection unit 120 causes the detection current Idtc to flow between the detection terminal T2 and the protection diodes 161 and 162 via the reverse blocking diode 163. Specifically, the current detection unit 120 causes the detection current Idtc to flow between one end of a parallel circuit composed of the protection diodes 161 and 162 and the detection terminal T2 via the reverse blocking diode 163. The current detection unit 120 operates using an internal power supply potential VDD.

The current compensation unit 110 causes a compensation current Icmp to flow between the detection terminal T2 and the protection diodes 161 and 162 via the reverse blocking diode 163. Specifically, the current compensation unit 110 causes the compensation current Icmp to flow between one end of the parallel circuit composed of the protection diodes 161 and 162 and the detection terminal T2 via the reverse blocking diode 163. The current compensation unit 110 operates using an internal power supply potential VDD.

The current amplification unit 130 amplifies the detection current Idtc of the current detection unit 120. Specifically, the current amplification unit 130 generates a current corresponding to the detection current Idtc of the current detection unit 120, and amplifies the generated current. For example, the current amplification unit 130 generates the same current as the detection current Idtc of the current detection unit 120, and amplifies the generated current. This amplification generates an output current Iout obtained by amplifying the detection current Idtc. The current amplification unit 130 causes the output current Iout passing through the output terminal T3 to flow. In the present embodiment, a negative output current Iout is output from the output terminal T3.

(Outline of Operation)

Figure 2:
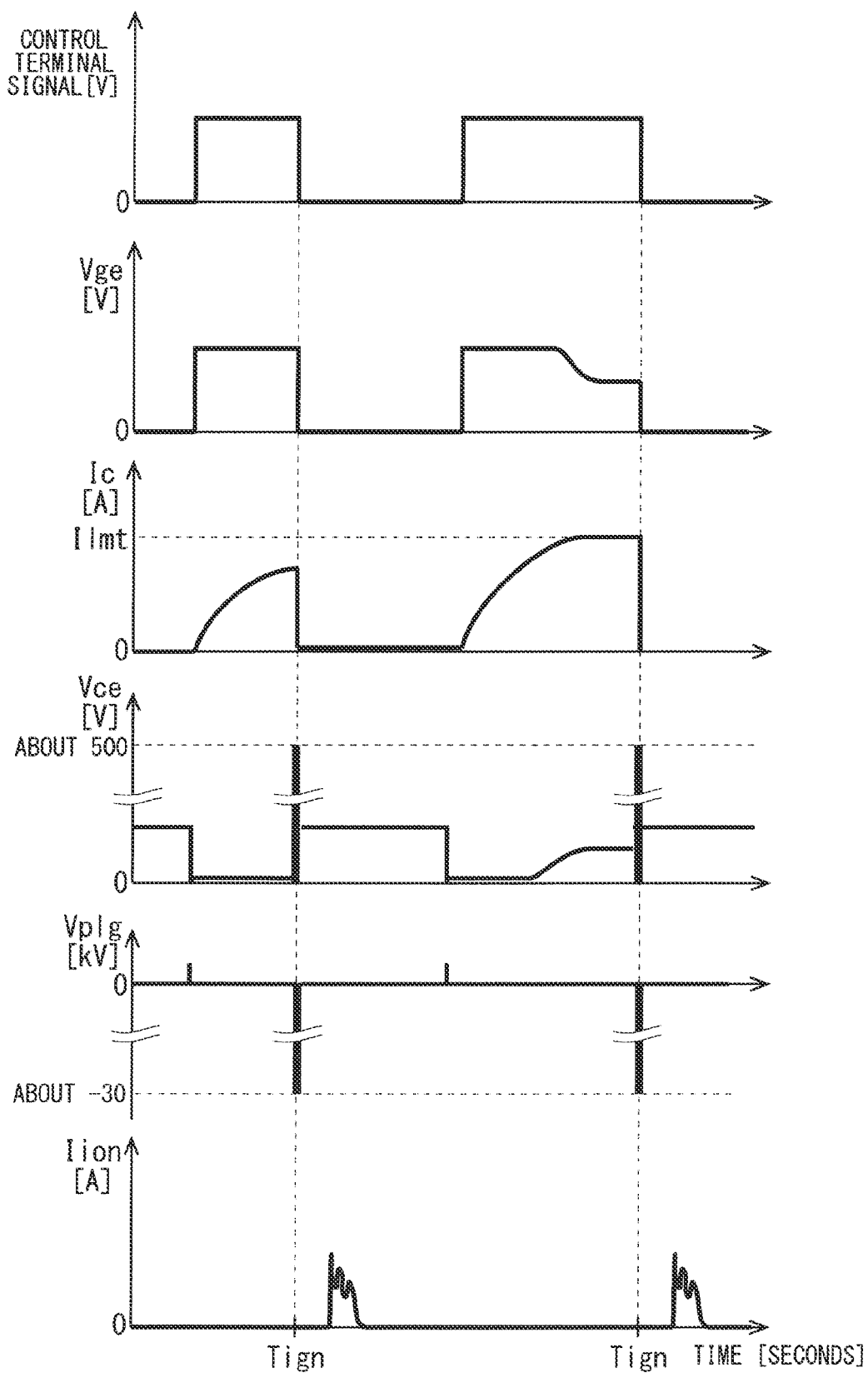
FIG. 2 is a time chart diagram showing an example of an operation of the ignition system of FIG. 1.

FIG. 2 is a time chart diagram showing an example of an operation of the ignition system 300 (FIG. 1). Hereinafter, operating waveforms of the ignition system 300 will be described with reference to FIGS. 1 and 2.

When the drive unit 213 receives an ON signal from the ECU at the control terminal T6, the drive unit 213 sends a drive signal from the drive terminal T7 to the gate of the IGBT 211. With this, the IGBT 211 is brought into an ON state. As a result, the collector current Ic as a load current flows according to a time constant determined by inductance of the ignition coil 90 and wiring resistance.

At a scheduled ignition timing Tign of an air-fuel mixture, the ECU stops the output of the ON signal. As a result, the drive unit 213 stops applying a gate-emitter voltage Vge which is a threshold value or more to the IGBT 211. As a result, the IGBT 211 is suddenly brought into an OFF state and the collector current Ic is cut off. As a result, a voltage due to a counter electromotive force is generated on a primary side of the ignition coil 90 (transformer). At this time, a collector-emitter voltage Vce of the IGBT 211 momentarily rises to, for example, about +500V. Then, a high voltage obtained by multiplying the voltage generated on the primary side by the number of turns is excited on a secondary side of the ignition coil 90. This high voltage is generally a high voltage of about −30 kV or more, and this is applied as the voltage Vplg of the spark plug 92. This high voltage causes discharge in the spark plug 92. If the air-fuel mixture is ignited by this discharge, combustion is started.

At the moment when the spark plug 92 discharges as described above, the ignition current Ispk (FIG. 1) flows. The ignition current Ispk is released from the reference terminal T1 after passing through the constant voltage diode 221 and the protection diode 161. At this time, the reverse blocking diode 163 prevents the ignition current Ispk from flowing into the current detection unit 120 and the current compensation unit 110. When the ignition current Ispk flows through the constant voltage diode 221, a predetermined voltage (for example, about 150V) is generated. This voltage charges the capacitor 222.

When the ignition current Ispk decreases to zero, the voltage of the capacitor 222 charged as described above is applied to the spark plug 92. If combustion is performed normally at this time, an ion current Iion of about several μA to about several hundred μA flows. The ion current detection circuit 101 detects this ion current Iion, amplifies it about 5 times, and outputs it. The voltage of the detection terminal T2 when the ion current Iion is detected is extremely lower than the voltage of the detection terminal T2 when the ignition current Ispk flows. Therefore, although the protection diode 161 has a forward direction for the voltage, it approximately blocks the ion current Iion. However, this blocking is not perfect and allows a certain amount of leakage current to flow. Further, the protection diode 162 for surge protection also has a reverse direction for the voltage, but allows a certain amount of leakage current to flow. In the present embodiment, the sum of these currents is a leakage current Idlk. Since the current detection unit 120 cannot distinguish between the ion current Iion and the leakage current Idlk, if no measures are taken, the detection result of the ion current Iion is disturbed depending on the magnitude of the leakage current Idlk. In the present embodiment, as will be described in detail later, the compensation current Icmp for compensating for the leakage current Idlk is supplied. As a result, the disturbance of the detection result is suppressed.

(Details of Configuration of Ion Current Detection Circuit and Operation Thereof)

Figure 3:
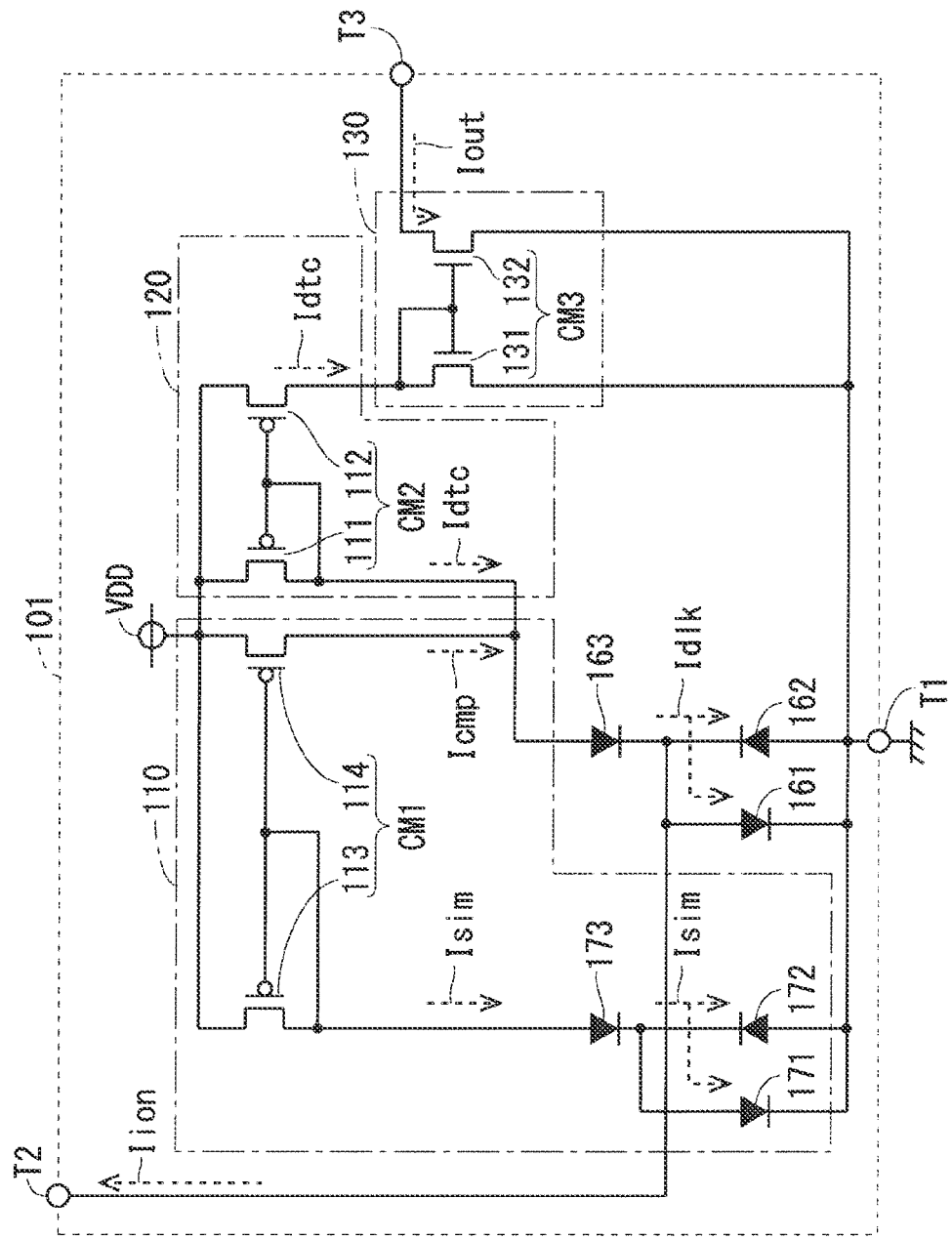
FIG. 3 is a circuit diagram showing an example of a configuration of an ion current detection circuit in FIG. 1.

FIG. 3 is a circuit diagram showing an example of a configuration of the ion current detection circuit 101 (FIG. 1).

The current compensation unit 110 includes compensation diodes 171 and 172. The compensation diodes 171 and 172 are a plurality of diodes connected in antiparallel to each other. One end (lower end in FIG. 3) of each of the compensation diodes 171 and 172 is connected to the reference terminal T1. The compensation diode 171 has a forward direction toward the reference terminal T1. The compensation diode 172 has a forward direction from the reference terminal T1 (in other words, has a reverse direction toward the reference terminal T1). The current compensation unit 110 generates the compensation current Icmp according to a pseudo leakage current Isim, which is a current flowing through the compensation diodes 171 and 172. In the present embodiment, the pseudo leakage current Isim is the sum of the current flowing through the compensation diode 171 and the current flowing through the compensation diode 172.

The current compensation unit 110 includes a current mirror circuit CM1 that generates a current which is k times as large as the pseudo leakage current Isim as the compensation current Icmp. In other words, the current mirror circuit CM1 has a current mirror ratio k. The current mirror circuit CM1 may satisfy k=1 or k>1. The current mirror circuit CM1 includes a PMOS (p-type MOSFET) 113 that causes the pseudo leakage current Isim to flow to the compensation diodes 171 and 172 via a diode 173, and a PMOS 114 that causes the compensation current Icmp to flow according to the pseudo leakage current Isim. In order for the compensation current Icmp to be k times the pseudo leakage current Isim, it is only necessary that the actual size of the PMOS 114 is k times the actual size of the PMOS 113. Here, the PMOS may be composed of a plurality of transistor elements connected in parallel to each other, which will be described later.

The protection diode 162 (first element) has an effective area which is approximately k times the effective area of the compensation diode 172 (second element). Further, the protection diode 161 (third element) has an effective area which is approximately k times the effective area of the compensation diode 171 (fourth element).

With this, $$Isim = Idlk/k \quad (1)$$

is almost satisfied. Here, the current mirror circuit CM1 satisfies $$Icmp = Isim \times k \quad (2),$$

$$Icmp = Idlk \quad (3)$$

is almost satisfied.

During the detection operation of the ion current Iion, with reference to FIG. 1, $$Iion + Idlk = Idtc + Icmp \quad (4)$$

is satisfied. From the equations (3) and (4), $$Iion = Idtc \quad (5)$$

is almost satisfied. That is, the ion current Iion and the detection current Idtc are almost equal. Therefore, the detection current Idtc as the detection result of the ion current Iion has high accuracy.

As the temperature rises, the leakage current Idlk of the protection diodes 161 and 162 increases, but at the same time, the pseudo leakage current Isim of the compensation diodes 171 and 172 also increases. Therefore, even when the temperature is high, an error of the detection current Idtc as the detection result of the ion current Iion is suppressed.

As k is increased, the size of the compensation diodes 171 and 172 can be reduced, and thus the current compensation unit 110 can be reduced. However, if k is excessively large, the accuracy of the proportional relationships of the above equations (1) and (2) are lowered, so that an error of the equation shown in the equation (3) becomes large. Therefore, the value of k is selected in consideration of the degree of this error.

The diode 173 is provided to obtain a voltage drop substantially similar to the voltage drop of the reverse blocking diode 163 so that the voltage applied to the protection diodes 161 and 162 and the voltage applied to the compensation diodes 171 and 172 are substantially the same. The closer these voltages are, the more accurately the proportional relationship of the pseudo leakage current Isim with respect to the leakage current Idlk is satisfied. However, the diode 173 may be omitted if circuit simplification is prioritized.

The effective area of the diode depends on the junction length, area, and the like. Further, a plurality of diode elements connected in parallel in the same forward direction may be regarded as one diode. For example, by connecting m number of the same diode elements in parallel, a diode having an effective area of m times can be obtained.

It is preferable that the protection diode 161 and the compensation diode 171 are diodes of the same type. Further, it is preferable that the protection diode 162 and the compensation diode 172 are diodes of the same type. Further, it is preferable that the reverse blocking diode 163 and the diode 173 are diodes of the same type. In particular, when k=1, it is preferable that the protection diode 161 and the compensation diode 171 are substantially the same not only in type but also in size. Further, it is preferable that the protection diode 162 and the compensation diode 172 are substantially the same not only in type but also in size. Further, it is preferable that the reverse blocking diode 163 and the diode 173 are substantially the same not only in type but also in size.

The current detection unit 120 includes a current mirror circuit CM2. The current mirror circuit CM2 includes a PMOS 111 that causes the detection current Idtc to flow to the protection diodes 161 and 162 via the reverse blocking diode 163, and a PMOS 112 that supplies a current proportional to the detection current Idtc to the current amplification unit 130. FIG. 3 shows an example in which the PMOS 112 causes a current substantially the same as the detection current Idtc to flow.

The current amplification unit 130 includes a current mirror circuit CM3. The current mirror circuit CM3 includes an NMOS 131 through which a current from the current detection unit 120 is caused to flow, and an NMOS 132 that causes the output current Iout proportional to this current to flow between the output terminal T3 and the reference terminal T1. The amplification factor of the output current Iout with respect to the detection current Idtc can be set by the current ratio (current mirror ratio) of the current mirror circuit CM3. When the current ratio of the current mirror circuit CM2 is different from 1:1, the amplification factor is set by the combination of the current ratio of the current mirror circuit CM2 and the current ratio of the current mirror circuit CM3.

(Summary of Effect)

The current compensation unit 110 (FIG. 3) causes the compensation current Icmp to flow between the detection terminal T2 and the parallel junction of the protection diodes 161 and 162. As a result, the leakage current Idlk flowing through the protection diodes 161 and 162 is compensated for. Therefore, the error of the detection current Idtc due to the leakage current Idlk, in other words, the detection error of the ion current Iion due to the leakage current Idlk is suppressed. Therefore, the detection accuracy of the ion current Iion can be improved. By referring to this detection result, the ignition system 300 (FIG. 1) can more reliably perform the ignition operation using the spark plug 92 at a more appropriate timing.

Since the current compensation unit 110 includes the compensation diodes 171 and 172, the pseudo leakage current Isim corresponding to the leakage current Idlk flowing through the protection diodes 161 and 162 can be generated in the current compensation unit 110. By generating the compensation current Icmp according to the pseudo leakage current Isim, the magnitude of the compensation current Icmp can be made approximately the same as the leakage current Idlk. As a result, the leakage current Idlk is compensated for with high accuracy. Therefore, a detection error of the ion current due to the leakage current Idlk is more reliably suppressed. Therefore, the detection accuracy of the ion current can be further improved.

The current compensation unit 110 includes the current mirror circuit that generates a current which is k times as large as the pseudo leakage current Isim as the compensation current Icmp. As a result, the compensation current Icmp can be generated according to the pseudo leakage current Isim.

When k=1, the compensation current Icmp which is substantially the same as the pseudo leakage current Isim is generated. Therefore, in order for the compensation current Icmp and the leakage current Idlk to be approximately the same, the pseudo leakage current Isim is set to be approximately the same as the leakage current Idlk. In order to realize this, as the compensation diodes 171 and 172, configurations substantially similar to the configurations of the protection diodes 161 and 162 can be used. Therefore, the compensation diodes 171 and 172 can be easily prepared.

When k>1, the pseudo leakage current Isim is smaller than the compensation current Icmp. Therefore, in order for the compensation current Icmp and the leakage current Idlk to be approximately the same, the pseudo leakage current Isim is set smaller than the leakage current Idlk. In order to realize this, as the compensation diodes 171 and 172, configurations smaller than the configurations of the protection diodes 161 and 162 can be used. That is, the size of the compensation diodes 171 and 172 can be reduced.

The protection diodes 161 and 162 are a plurality of diodes connected in antiparallel to each other. As a result, the diode characteristics for ignition current and the diode characteristics for surge protection can be adjusted approximately independently.

By the reverse blocking diode 163, the ignition current Ispk (FIG. 1) can be prevented from flowing into the current detection unit 120 and the current compensation unit 110. As a result, the current detection unit 120 and the current compensation unit 110 can be protected from the ignition current Ispk, which is a large current.

When the ignition current Ispk of the spark plug 92 is generated, the capacitor 222 can be charged by the constant voltage generated in the constant voltage diode 221. By the voltage of the charged capacitor 222, the ion current Iion can be generated.

The current amplification unit 130 amplifies the detection current Idtc to generate the output current Iout that represents information on the detection current Idtc. At this time, an error amount of the detection current Idtc is amplified as it is in the current amplification unit 130. Therefore, an output error tends to be large. According to the present embodiment, the error of the detection current Idtc is suppressed as described above. Therefore, the output error can be effectively suppressed.

In the present embodiment, an analog current output is used as an output representing the information on the detection current Idtc, but the output format is not limited to this, and for example, an analog voltage output or a digital output may be used.

Second Embodiment

Figure 4:
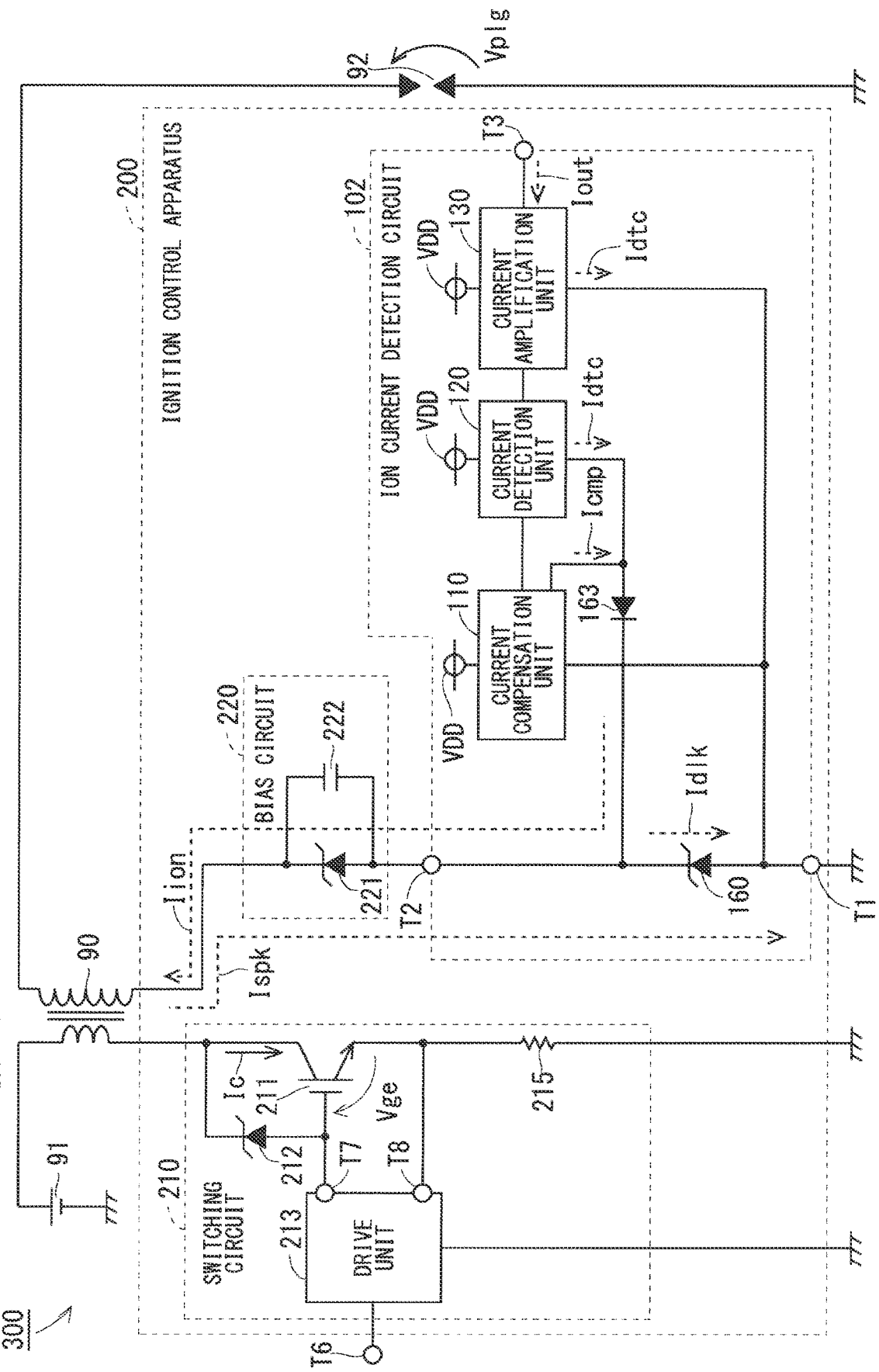
FIG. 4 is a circuit diagram schematically showing a configuration of an ignition system in a second embodiment of the present invention.
Figure 5:
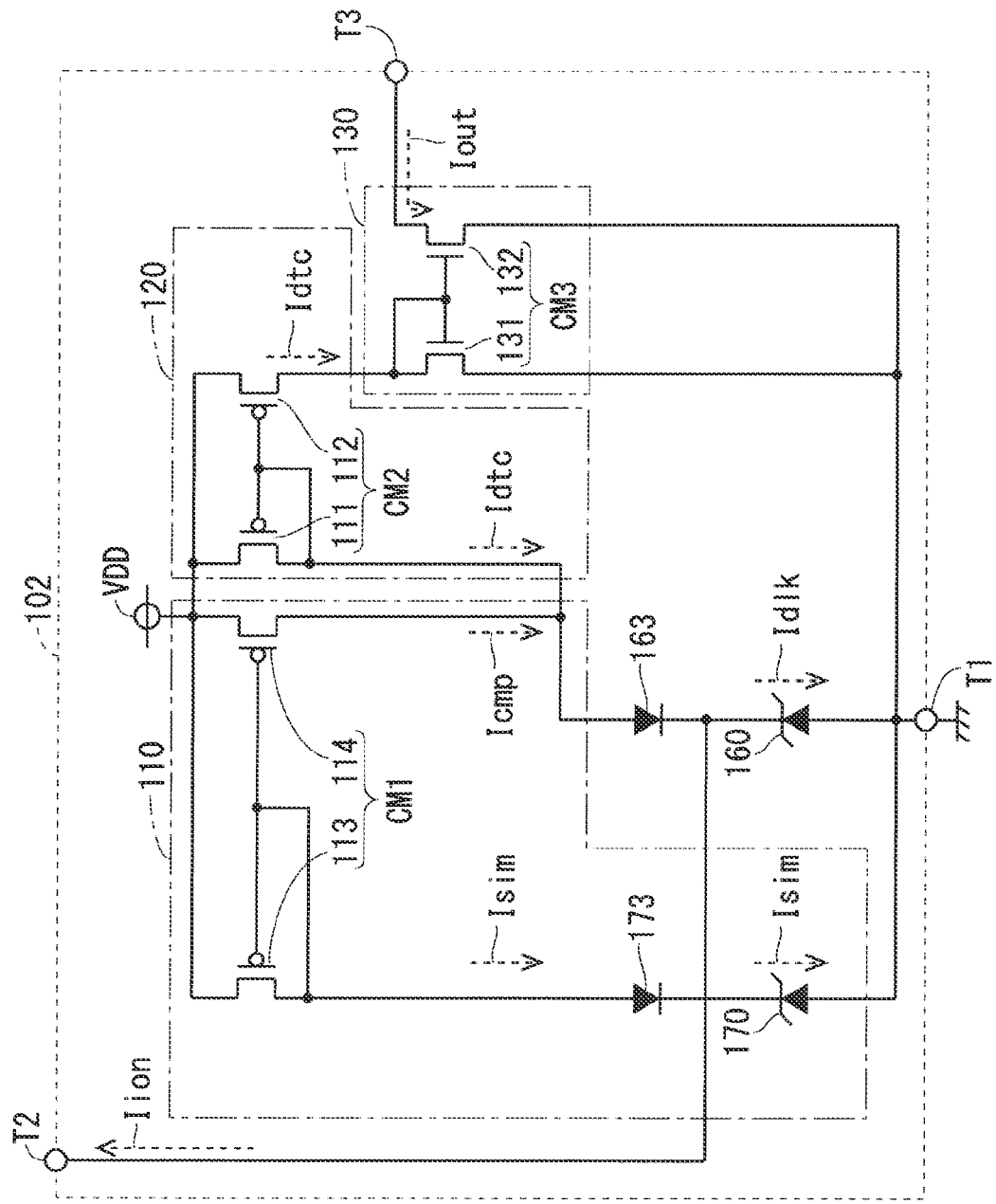
FIG. 5 is a circuit diagram showing an example of a configuration of an ion current detection circuit in FIG. 4.

FIG. 4 is a circuit diagram schematically showing a configuration of an ignition system 300 in a second embodiment. In the present embodiment, an ion current detection circuit 102 is provided in place of the ion current detection circuit 101 (FIG. 1: the first embodiment). FIG. 5 is a circuit diagram showing an example of a configuration of the ion current detection circuit 102 (FIG. 4).

The ion current detection circuit 102 (FIG. 5) includes a protection diode 160 in place of the protection diodes 161 and 162 (FIG. 3). The protection diode 160 is, for example, a Zener diode or an avalanche diode having a forward direction opposite to a direction of an ignition current Ispk. Since the protection diode 160 has a forward direction opposite to the direction of the ignition current Ispk, a detection terminal T2 and a reference terminal T1 are approximately insulated from each other when an ion current Iion, which is a weak current, is detected. When the ignition current Ispk is flowing, the protection diode 160 is clamped by a reverse voltage.

Further, the ion current detection circuit 102 (FIG. 5) includes a compensation diode 170 in place of the compensation diodes 171 and 172 (FIG. 3). One end (lower end in FIG. 5) of the compensation diode 170 is connected to the reference terminal T1. The compensation diode 170 has a forward direction from the reference terminal T1 (in other words, has a reverse direction toward the reference terminal T1).

The protection diode 160 (first element) has an effective area which is approximately k times the effective area of the compensation diode 170 (second element). It is preferable that the protection diode 160 and the compensation diode 170 are diodes of the same type. In particular, when k=1, it is preferable that the protection diode 160 and the compensation diode 170 are substantially the same not only in type but also in size.

Since the configurations other than the above are substantially the same as the configurations of the first embodiment described above, the same or corresponding elements are designated by the same reference numerals, and the description thereof will not be repeated.

According to the present embodiment, while a simpler configuration as compared with the first embodiment is used, the flow of the ignition current Ispk (FIG. 4) is allowed by the reverse direction current of the protection diode 160, and a surge current can be released by the forward direction current of the protection diode 160.

Third Embodiment

Figure 6:
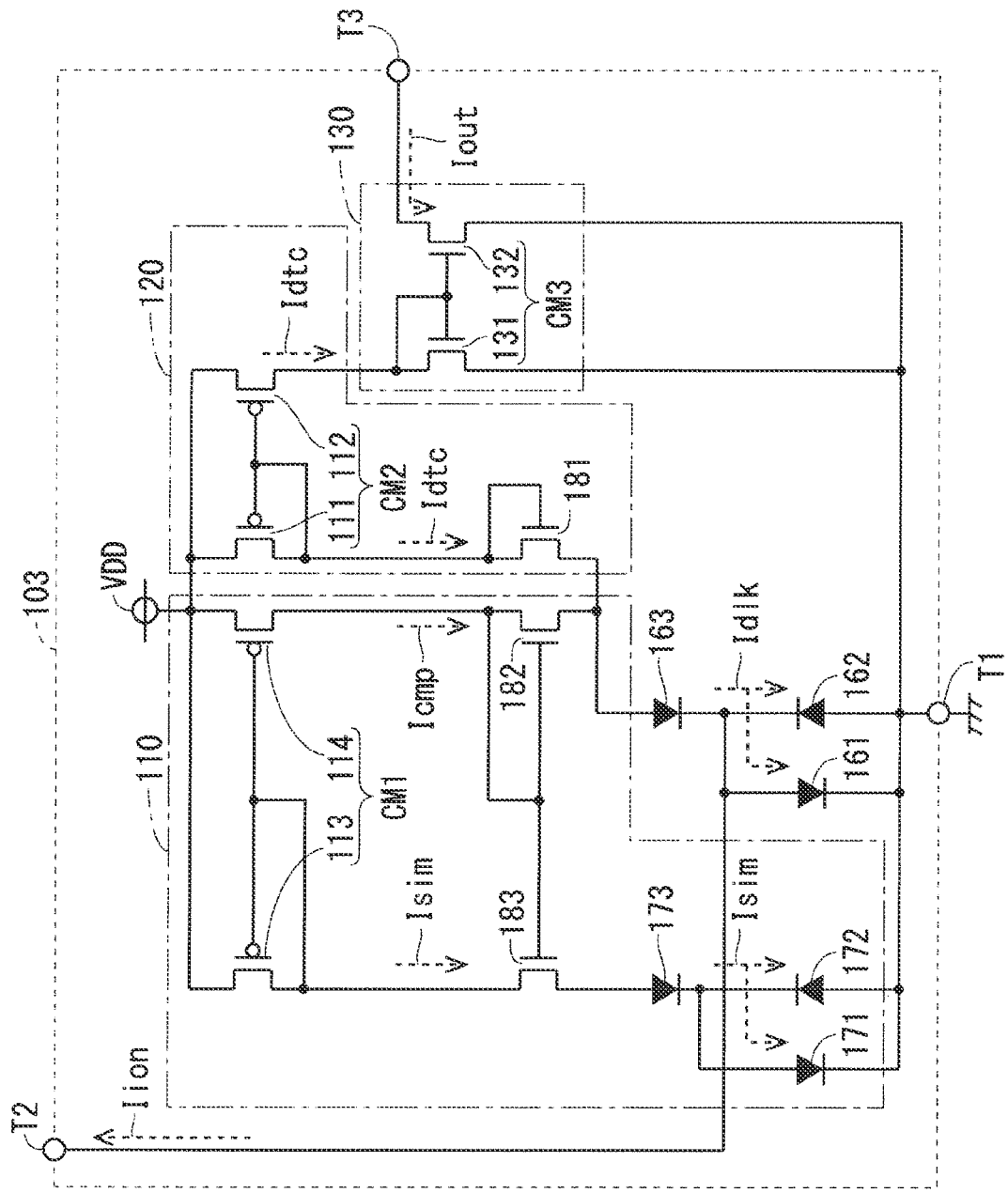
FIG. 6 is a circuit diagram showing an example of a configuration of an ion current detection circuit in a third embodiment of the present invention.

FIG. 6 is a circuit diagram showing an example of a configuration of an ion current detection circuit 103 in a third embodiment. In the present embodiment, a current detection unit 120 includes a diode-connected NMOS 181. The NMOS 181 causes a detection current Idtc to flow between a detection terminal T2 and protection diodes 161 and 162 via a reverse blocking diode 163. A current compensation unit 110 includes an NMOS 183 connected in series with a PMOS 113 and an NMOS 182 connected in series with a PMOS 114. A gate of the NMOS 182 and a gate of the NMOS 183 are short-circuited. The NMOS 182 is diode-connected. Since the configurations other than these are substantially the same as the configurations of the first embodiment described above, the same or corresponding elements are designated by the same reference numerals, and the description thereof will not be repeated.

According to the present embodiment, a leakage current Idlk is suppressed by a voltage drop in the diode-connected NMOS 181. Further, a compensation current Icmp suppressed corresponding to the leakage current Idlk suppressed as described above can be generated by voltage drops of the NMOS 183 and the NMOS 182. This reduces the leakage current Idlk itself, which requires compensation, and provides appropriate compensation for it. Therefore, a detection error of an ion current Iion is further suppressed.

Fourth Embodiment

Figure 7:
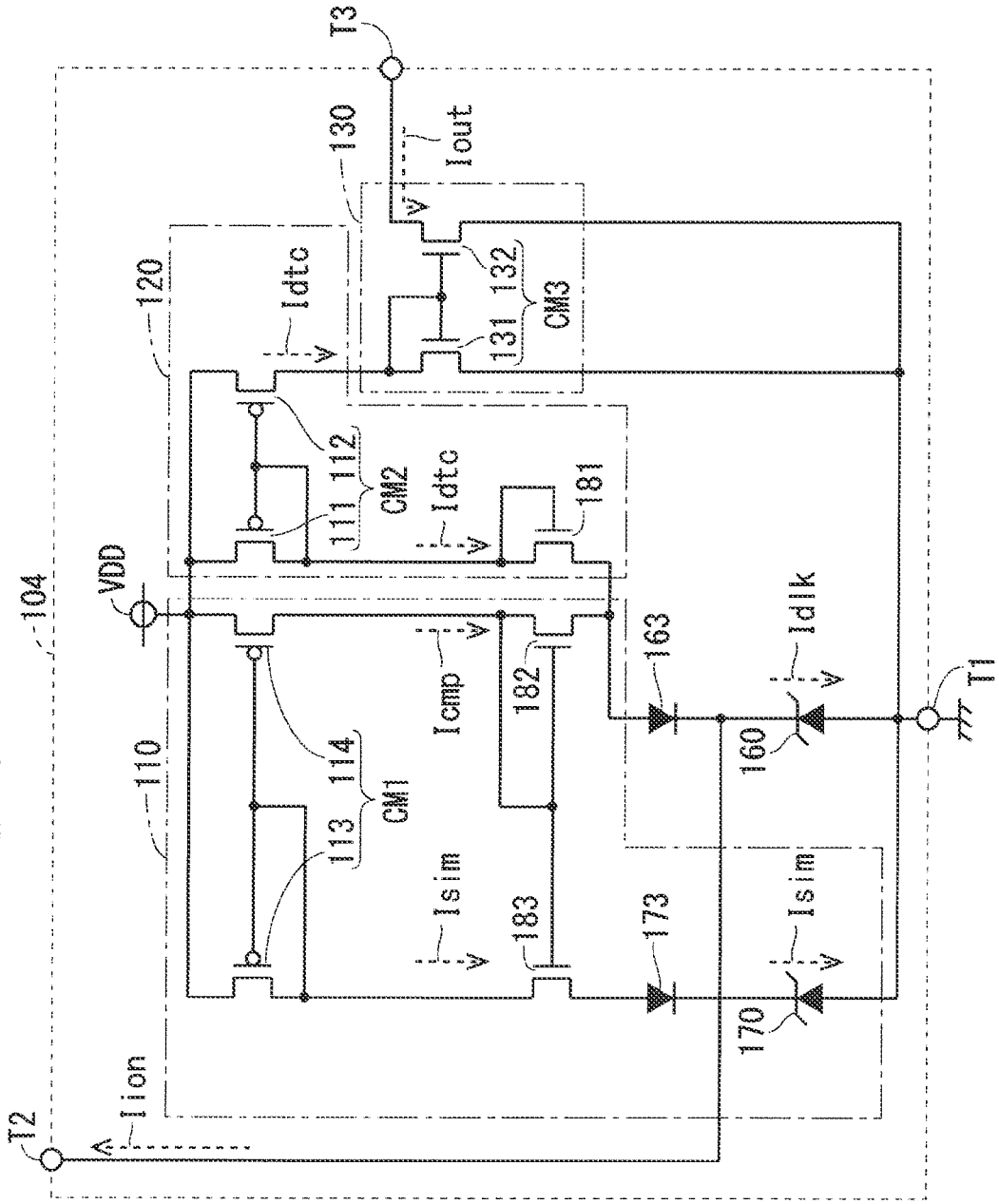
FIG. 7 is a circuit diagram showing an example of a configuration of an ion current detection circuit in a fourth embodiment of the present invention.

FIG. 7 is a circuit diagram showing an example of a configuration of an ion current detection circuit 104 in a fourth embodiment. The ion current detection circuit 104 includes a protection diode 160 in place of the protection diodes 161 and 162 (FIG. 6: the third embodiment) and a compensation diode 170 in place of the compensation diodes 171 and 172 (FIG. 6: the third embodiment). The protection diode 160 and the compensation diode 170 are similar to those in the second embodiment (FIG. 5). Since the configurations other than these are substantially the same as the configurations of the third embodiment described above, the same or corresponding elements are designated by the same reference numerals, and the description thereof will not be repeated.

According to the present embodiment, an effect similar to the effect of the third embodiment can be obtained when the protection diode 160 described in the second embodiment (FIG. 5) is used.

The specific circuit described in each of the above embodiments is an example, and a part or an entirety of the specific circuit may be replaced with another circuit having the similar function.

Figure 8:
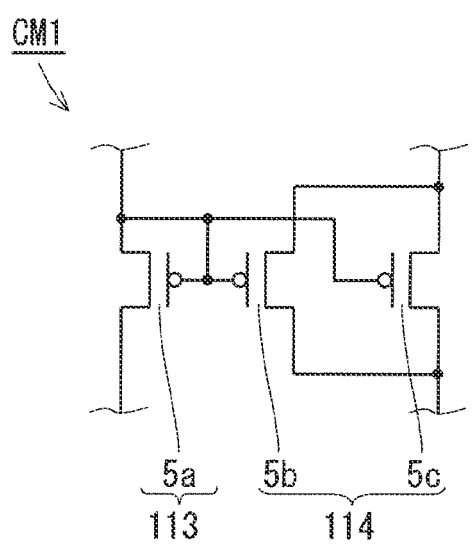
FIG. 8 is a circuit diagram showing a first example of a current mirror circuit.
Figure 9:
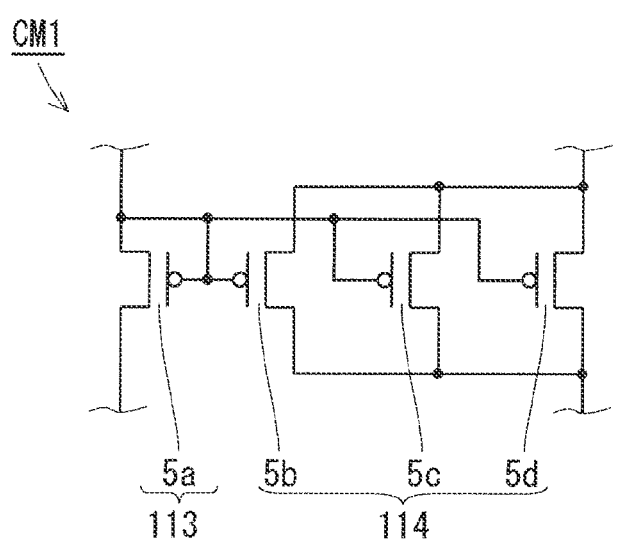
FIG. 9 is a circuit diagram showing a second example of a current mirror circuit.

In order to obtain the current mirror ratio k, a plurality of transistor elements connected in parallel may be used on one side or both sides of the current mirror circuit. Each of these transistor elements may have substantially the same configuration. For example, FIG. 8 shows a current mirror circuit CM1 having a current mirror ratio of 2. In FIG. 8, a PMOS 113 is composed of a PMOS element Sa, and a PMOS 114 is composed of PMOS elements 5b and 5c. The PMOS elements 5b and Sc are connected in parallel to each other. The PMOS elements 5a to Sc have substantially the same configuration. Further, FIG. 9 shows a current mirror circuit CM1 having a current mirror ratio of 3. In FIG. 9, a PMOS 113 is composed of a PMOS element Sa, and a PMOS 114 is composed of PMOS elements 5b to 5d. The PMOS elements 5b to 5d are connected in parallel to each other. The PMOS elements Sa to 5d have substantially the same configuration.

The ion current detection circuits 101 to 104 each have the Complementary Metal Oxide Semiconductor (CMOS) circuit having PMOSs and NMOSs, but a bipolar circuit or a bipolar CMOS (BiCMOS) circuit may be used as a modification example. Further, although only one reference terminal T1 is shown in each figure, a plurality of reference terminals separated from each other may be provided for noise countermeasures and the like. Further, each of the ion current detection circuits 101 to 104 and the drive unit 213 may be formed on a common semiconductor substrate, or may be formed on different semiconductor substrates.

In the present invention, the embodiments can be freely combined, and each embodiment can be appropriately modified or omitted within the scope of the present invention. Although the present invention has been described in detail, the above description is exemplary in all aspects and the present invention is not limited thereto. It is understood that a myriad of modification examples not described may be envisioned without departing from the scope of the present invention.

EXPLANATION OF REFERENCE SIGNS

CM1-CM3: current mirror circuit
Idtc: detection current
Idlk: leakage current
Ispk: ignition current
Icmp: compensation current
Iion: ion current
Isim: pseudo leakage current
Iout: output current
T1: reference terminal
T2: detection terminal
T3: output terminal
T6: control terminal
T7: drive terminal
T8: monitor terminal
90: ignition coil
91: battery (power supply)
92: spark plug
101-104: ion current detection circuit
110: current compensation unit
120: current detection unit
130: current amplification unit (amplification unit)
160-162: protection diode
163: reverse blocking diode
170-172: compensation diode
173: diode
200: ignition control apparatus
210: switching circuit
211: IGBT (semiconductor switching element)
212: Zener diode
213: drive unit
215: monitor resistor
220: bias circuit
221: constant voltage diode
222: capacitor
300: ignition system

The invention claimed is:

1. An ion current detection circuit that detects an ion current flowing through a spark plug for an internal combustion engine, comprising:
   a detection terminal that is to be electrically connected to the spark plug;
   a reference terminal to which a reference potential is to be supplied;
   at least one protection diode provided between the detection terminal and the reference terminal;
   a current detection unit that allows a detection current to flow between the detection terminal and the at least one protection diode; and
   a current compensation unit that allows a compensation current to flow between the detection terminal and the at least one protection diode.

2. The ion current detection circuit according to claim 1, further comprising an amplification unit that amplifies the detection current of the current detection unit.

3. The ion current detection circuit according to claim 1, wherein the current compensation unit includes at least one compensation diode, and
   wherein the current compensation unit generates the compensation current according to a pseudo leakage current, which is a current flowing through the at least one compensation diode.

4. The ion current detection circuit according to claim 3, wherein the at least one protection diode is a plurality of diodes connected in antiparallel to each other, and the at least one compensation diode is a plurality of diodes connected in antiparallel to each other.

5. The ion current detection circuit according to claim 3, wherein each of the at least one compensation diode and the at least one protection diode is a Zener diode or an avalanche diode.

6. The ion current detection circuit according to claim 3, wherein the current compensation unit includes a current mirror circuit that generates a current which is k times as large as the pseudo leakage current as the compensation current.

7. The ion current detection circuit according to claim 6, wherein the current mirror circuit of the current compensation unit satisfies k=1.

8. The ion current detection circuit according to claim 6, wherein the current mirror circuit of the current compensation unit satisfies k>1.

9. The ion current detection circuit according to claim 6, wherein the current detection unit includes a diode-connected transistor that causes the detection current to flow.

10. The ion current detection circuit according to claim 6, wherein the at least one protection diode includes at least one first element having a forward direction from the reference terminal to the detection terminal, the at least one compensation diode includes at least one second element having a forward direction from the reference terminal, and the at least one first element has an effective area which is k times an effective area of the at least one second element.

11. The ion current detection circuit according to claim 6, wherein the at least one protection diode includes at least one third element having a forward direction from the detection terminal toward the reference terminal, the at least one compensation diode includes at least one fourth element having a forward direction toward the reference terminal, and the at least one third element has an effective area which is k times an effective area of the at least one fourth element.

12. The ion current detection circuit according to claim 1, further comprising a reverse blocking diode that blocks a current in a direction reverse to a direction of the detection current between the detection terminal and the current detection unit,
  wherein the current compensation unit causes a compensation current to flow between the detection terminal and the at least one protection diode via the reverse blocking diode.

13. An ignition control apparatus that controls ignition of a spark plug for an internal combustion engine, comprising:
  a bias circuit including a constant voltage diode inserted in a path of an ion current flowing through the spark plug, and a capacitor connected in parallel to the constant voltage diode; and
  an ion current detection circuit that detects the ion current, wherein the ion current detection circuit includes:
    a detection terminal that is to be electrically connected to the spark plug;
    a reference terminal to which a reference potential is to be supplied;
    at least one protection diode provided between the detection terminal and the reference terminal;
    a current detection unit that allows a detection current to flow between the detection terminal and the at least one protection diode; and
    a current compensation unit that allows a compensation current to flow between the detection terminal and the at least one protection diode.

14. An ignition system for an internal combustion engine, comprising:
  a spark plug for the internal combustion engine;
  an ignition coil having a primary coil and a secondary coil that is connected to the spark plug;
  a power supply connected to the primary coil of the ignition coil; and
  an ignition control apparatus connected to the ignition coil,
  wherein the ignition control apparatus includes:
    a semiconductor switching element that opens and closes a current which is generated by the power supply and flows through the primary coil of the ignition coil;
    a bias circuit including a constant voltage diode inserted in a path of an ion current flowing through the spark plug, and a capacitor connected in parallel to the constant voltage diode; and
    an ion current detection circuit that detects the ion current,
  wherein the ion current detection circuit includes:
    a detection terminal electrically connected to the spark plug;
    a reference terminal to which a reference potential is supplied;
    at least one protection diode provided between the detection terminal and the reference terminal;
    a current detection unit that causes a detection current to flow between the detection terminal and the at least one protection diode; and
    a current compensation unit that causes a compensation current to flow between the detection terminal and the at least one protection diode.

* * * * *